United States Patent
Hanamura

(10) Patent No.: US 12,208,468 B2
(45) Date of Patent: Jan. 28, 2025

(54) PROCESSING APPARATUS

(71) Applicant: DISCO CORPORATION, Tokyo (JP)

(72) Inventor: Natsuko Hanamura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 351 days.

(21) Appl. No.: 17/661,579

(22) Filed: May 2, 2022

(65) Prior Publication Data
US 2022/0362883 A1 Nov. 17, 2022

(30) Foreign Application Priority Data
May 17, 2021 (JP) .................. 2021-083249

(51) Int. Cl.
| | | |
|---|---|---|
| *B25B 11/00* | (2006.01) | |
| *B23K 26/03* | (2006.01) | |
| *B23K 26/08* | (2014.01) | |
| *B23K 26/70* | (2014.01) | |
| B23K 101/40 | (2006.01) | |

(52) U.S. Cl.
CPC .......... *B23K 26/083* (2013.01); *B23K 26/032* (2013.01); *B23K 26/702* (2015.10); *B23K 2101/40* (2018.08)

(58) Field of Classification Search
CPC ...... B25B 11/00; B25B 11/005; B23K 26/702
See application file for complete search history.

(56) References Cited

U.S. PATENT DOCUMENTS

| | | | | |
|---|---|---|---|---|
| 6,332,724 | B1* | 12/2001 | Yano | H01L 21/67248 118/69 |
| 6,811,466 | B1* | 11/2004 | Swedek | H01L 21/67219 451/60 |
| 2010/0120333 | A1* | 5/2010 | Sin | H01L 22/12 451/287 |
| 2010/0211215 | A1* | 8/2010 | Yano | H01L 21/67017 700/228 |
| 2014/0234033 | A1* | 8/2014 | Iwashita | H01L 21/6838 406/88 |
| 2020/0058121 | A1* | 2/2020 | Mori | H01L 21/67109 |
| 2020/0306925 | A1* | 10/2020 | Kodama | H01L 21/67051 |
| 2021/0252661 | A1* | 8/2021 | Fukushi | H01L 21/68707 |

FOREIGN PATENT DOCUMENTS

JP 2012099755 A 5/2012

\* cited by examiner

*Primary Examiner* — Lee D Wilson
(74) *Attorney, Agent, or Firm* — GREER BURNS & CRAIN, LTD.

(57) ABSTRACT

A processing apparatus includes a delivery unit for delivering a workpiece between a cassette placed on a cassette rest and a chuck table and a measuring unit for measuring a thickness of the workpiece. The delivery unit includes a base having a non-contact-type suction holder for ejecting air to develop a negative pressure to attract and hold the workpiece under suction out of contact therewith, and a moving unit for moving the base. The height of the non-contact-type suction holder is adjusted according to the thickness of the workpiece measured by the measuring unit to place the non-contact-type suction holder in a position that is spaced from a face side of the workpiece by a distance in a predetermined range while the workpiece is being delivered by the delivery unit.

4 Claims, 5 Drawing Sheets

PROCESSING APPARATUS

BACKGROUND OF THE INVENTION

Field of the Invention

The present invention relates to a processing apparatus including a delivery unit.

Description of the Related Art

There has been known in the art an apparatus for processing, with a cutting blade or a laser beam, a plate-shaped workpiece such as a wafer, a resin-packaged substrate, or a glass substrate on which semiconductor devices, light emitting diodes (LEDs), etc. have been formed (see, for example, Japanese patent No. 5846734). The workpiece that has been housed in a cassette is introduced into a processing apparatus, delivered to a chuck table by a delivery unit in the processing apparatus, processed by a processing unit in the processing apparatus, delivered from the chuck table to a cleaning device or a cleaning unit where the workpiece is cleaned, and then returned to the cassette.

SUMMARY OF THE INVENTION

Various delivery units and methods are available for use in the processing apparatus. One of the delivery methods known in the art uses a non-contact-type suction holder that generates a vacuum pressure by ejecting air to a workpiece, as disclosed in Japanese patent No. 5846734. According to the disclosed delivery method, however, if an air ejection face, i.e., an end face, of the non-contact-type suction holder is spaced too far from the workpiece, the non-contact-type suction holder fails to apply a negative pressure to the workpiece. For example, in situations where workpieces are available in a variety of thicknesses ranging from 3.0 to 5.0 mm, if the non-contact-type suction holder is constantly set to a position for holding workpieces that are 3.0 mm thick under suction, then the non-contact-type suction holder is likely to fail to apply a sufficient negative pressure to workpieces that are 5.0 mm thick, and hence to unload those workpieces from the processing apparatus.

It is therefore an object of the present invention to provide a processing apparatus including a delivery unit that is capable of applying a sufficient negative pressure from a non-contact-type suction holder to a workpiece on the basis of the thickness thereof.

In accordance with an aspect of the present invention, there is provided a processing apparatus including a chuck table for holding a plate-shaped workpiece, a processing unit for processing the workpiece held on the chuck table, a cassette rest for placing thereon a cassette for housing the workpiece therein, a delivery unit for delivering the workpiece between the cassette placed on the cassette rest and the chuck table, and a measuring unit for measuring a thickness of the workpiece. The delivery unit includes a base having a non-contact-type suction holder for ejecting air to develop a negative pressure to attract and hold the workpiece under suction out of contact therewith, and a moving unit for moving the base, and in which the height of the non-contact-type suction holder is adjusted according to the thickness of the workpiece measured by the measuring unit to place the non-contact-type suction holder in a position that is spaced from a face side of the workpiece by a distance in a predetermined range while the workpiece is being delivered by the delivery unit.

The measuring unit may include a back pressure sensor or an optical sensor for measuring the thickness of the workpiece out of contact therewith.

According to the present invention, the non-contact-type suction holder can apply a sufficient negative pressure to the workpiece according to a thickness of the workpiece.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Preferred embodiments of the present invention will be described in detail hereinbelow with reference to the accompanying drawings. The present invention is not limited to the details of the embodiments described below. The components described below cover those which could easily be anticipated by those skilled in the art and those which are essentially identical to those described above. Furthermore, the arrangements described below can be combined in appropriate manners. Various omissions, replacements, or changes of the arrangements may be made without departing from the scope of the present invention.

First Embodiment

Figure 1:
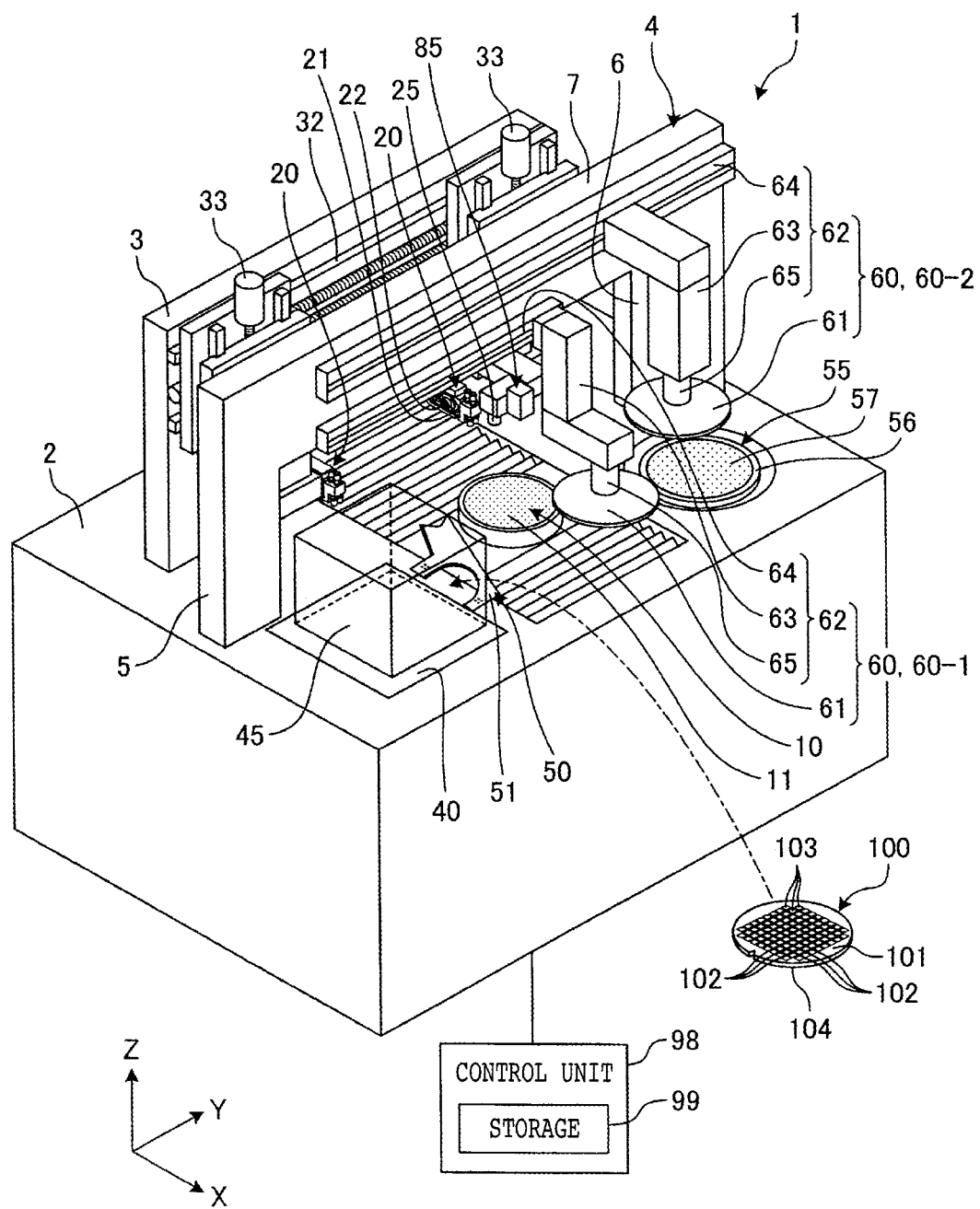
FIG. 1 is a perspective view of a structural example of a processing apparatus according to a first embodiment of the present invention.
Figure 2:
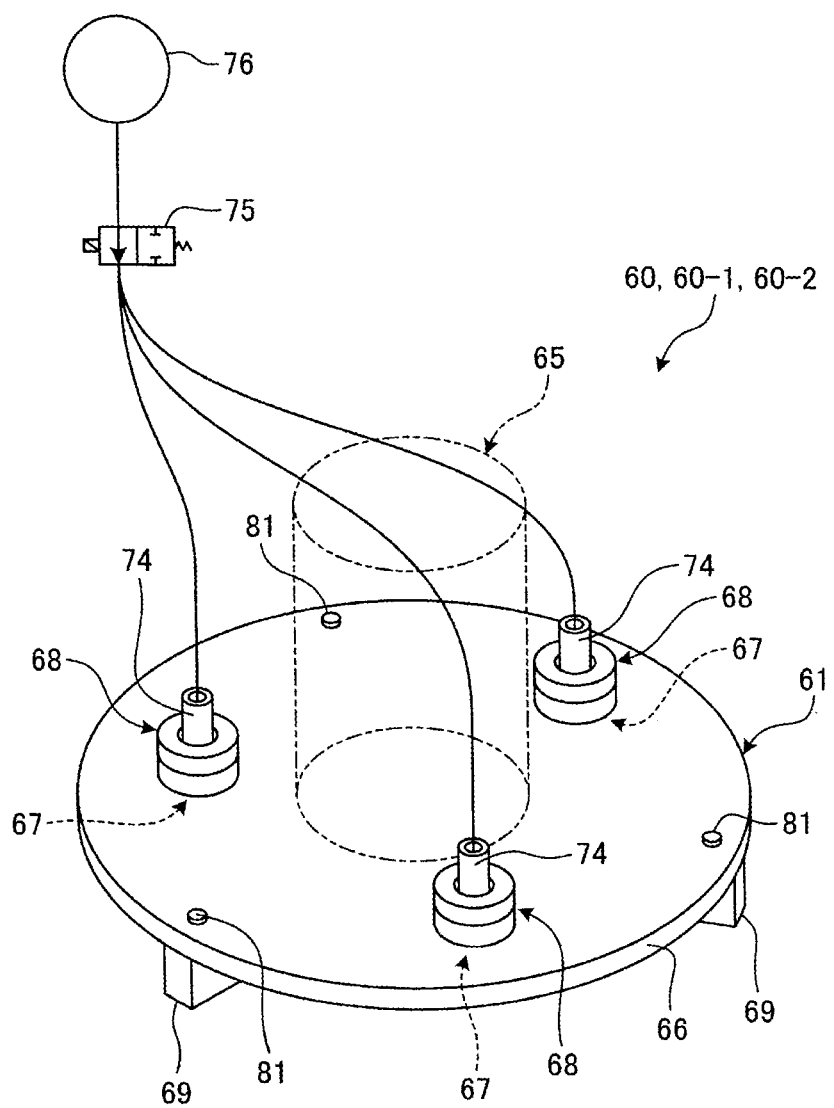
FIG. 2 is a perspective view of a structural example of a delivery unit of the processing apparatus illustrated in FIG. 1.
Figure 3:
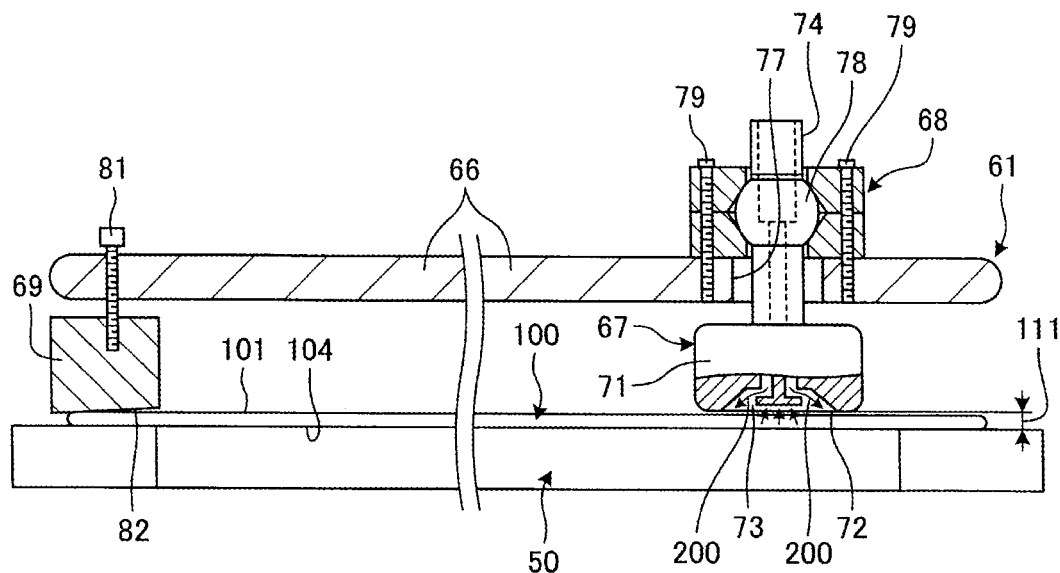
FIG. 3 is a cross-sectional view illustrating a manner in which the delivery unit of the processing apparatus illustrated in FIG. 1 operates.
Figure 4:
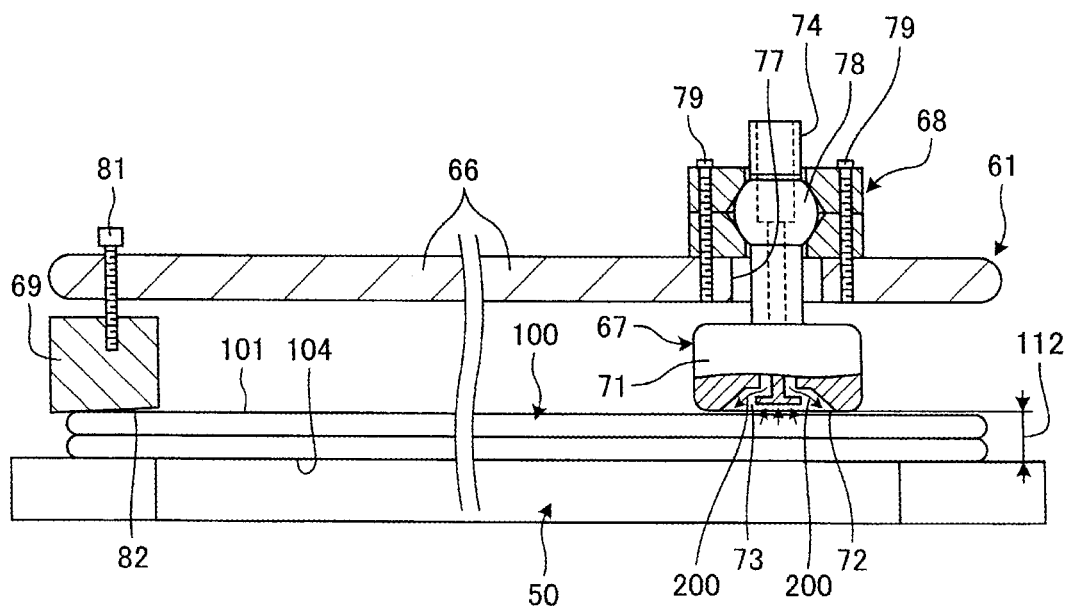
FIG. 4 is a cross-sectional view illustrating the manner in which the delivery unit of the processing apparatus illustrated in FIG. 1 operates.
Figure 5:
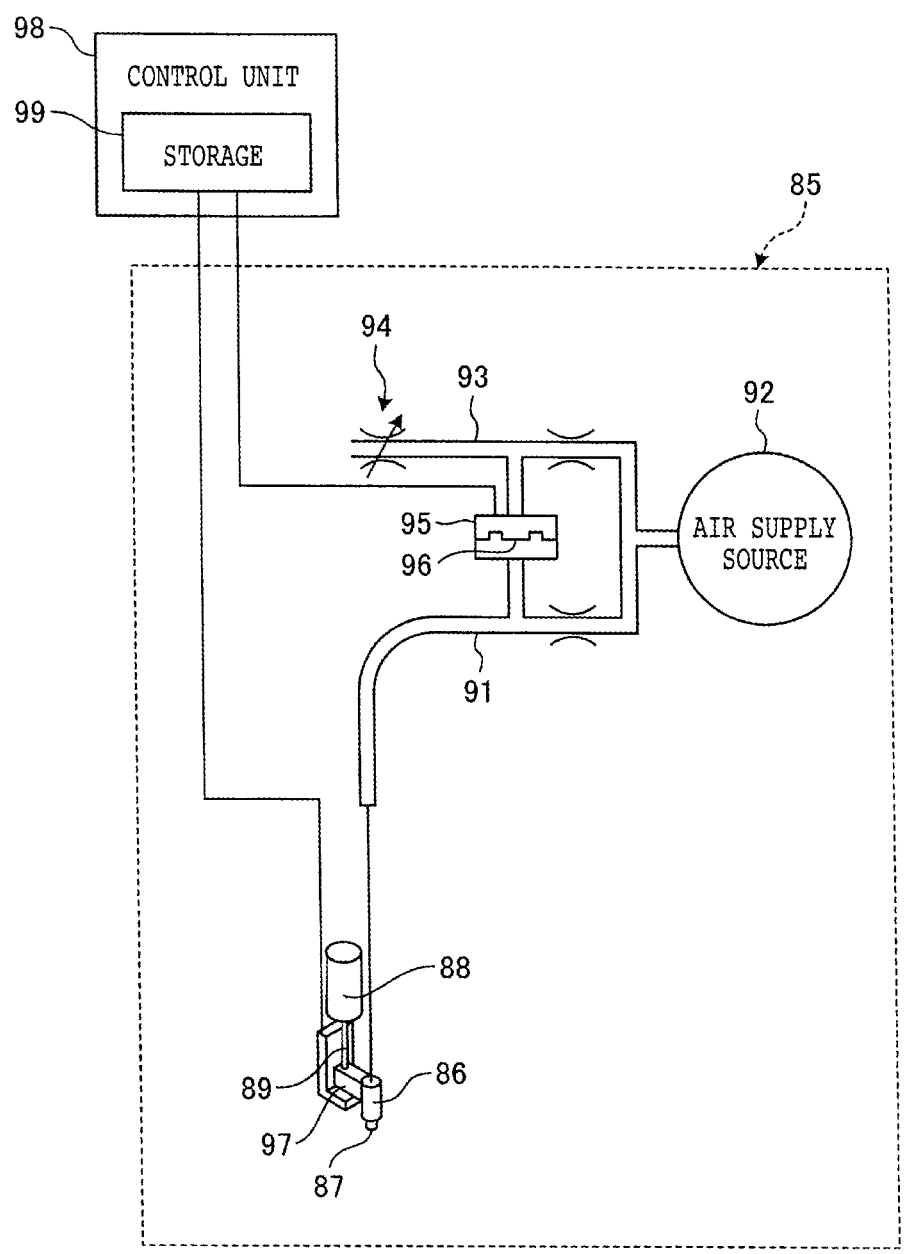
FIG. 5 is a view of a structural example of a measuring unit of the processing apparatus illustrated in FIG. 1.
Figure 6:
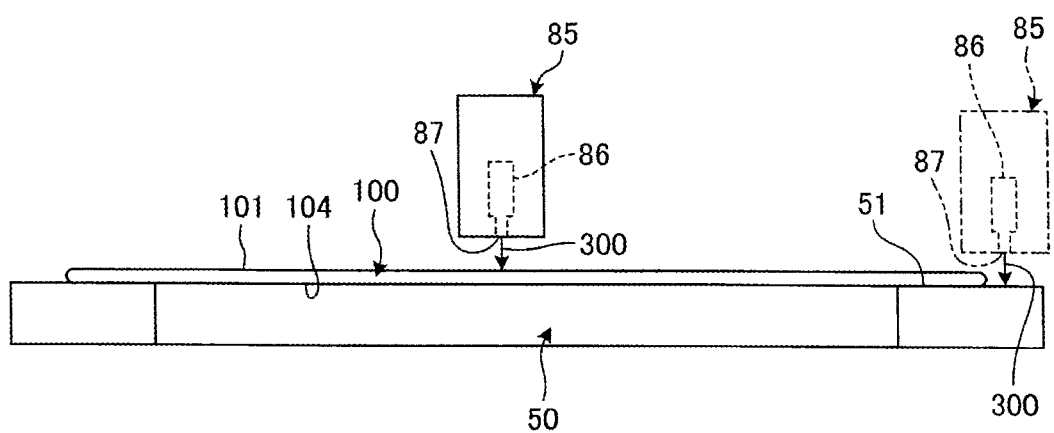
FIG. 6 is a cross-sectional view illustrating the manner in which the measuring unit of the processing apparatus illustrated in FIG. 1 operates.

A processing apparatus 1 according to a first embodiment of the present invention will be described below with reference to FIG. 1. FIG. 1 illustrates, in perspective, a structural example of the processing apparatus 1 according to the first embodiment. FIG. 2 illustrates, in perspective, a structural example of a delivery unit 60 of the processing apparatus 1 illustrated in FIG. 1. FIGS. 3 and 4 illustrate, in cross section, a manner in which the delivery unit 60 of the processing apparatus illustrated in FIG. 1 operates. FIG. 5 illustrates a structural example of a measuring unit 85 of the processing apparatus 1 illustrated in FIG. 1. FIG. 6 illustrates, in cross section, the manner in which the measuring unit 85 of the processing apparatus 1 illustrated in FIG. 1 operates. As illustrated in FIG. 1, the processing apparatus 1 includes a chuck table 10, a pair of processing units 20, a cassette rest 40, a loading/unloading unit 50, a cleaning device 55, a delivery unit 60, a measuring unit 85, and a control unit 98. In FIG. 1, the processing apparatus 1 is illustrated as placed in an XYZ coordinate system having an X-axis, a Y-axis, and a Z-axis. The X-axis and the Y-axis extend horizontally perpendicularly to each other and the Z-axis extends vertically perpendicularly to the X-axis and the Y-axis.

A workpiece 100 as an object to be processed by the processing apparatus 1 according to the first embodiment includes, for example, a semiconductor wafer, an optical device wafer, or the like shaped as a circular plate made of a base material such as silicon, sapphire, silicon carbide (SiC), or gallium arsenide. As illustrated in FIG. 1, the workpiece 100 has a plurality of devices 103 formed in respective areas demarcated on a flat face side 101 thereof by a grid of projected dicing lines 102. According to the present invention, the workpiece 100 may include a packaged substrate, a ceramic plate, a glass plate, or the like that is of a rectangular shape having a plurality of resin-encapsulated devices. According to the present invention, furthermore, the workpiece 100 may include a plate-shaped stacked assembly made up of a plurality of plate-shaped pieces such as wafers that are stacked or affixed together in thickness-wise directions.

The chuck table 10 has a frame shaped as a circular plate having a recess defined therein and a suction member frame shaped as a circular plate fitted in the recess. The suction member of the chuck table 10 is made of porous ceramic and held in fluid communication with a vacuum suction source, not depicted, through a vacuum suction channel, not depicted. The suction member of the chuck table 10 has an upper surface functioning as a holding surface 11 for holding the workpiece 100 placed thereon under a suction force, i.e., a negative pressure, transmitted from the vacuum suction source via the vacuum suction channel. The holding surface 11 lies flush with an upper surface of the frame of the chuck table 10 and extends parallel to an XY plane defined as a horizontal plane by the X-axis and the Y-axis. The chuck table 10 is movable by an X-axis moving unit in one of X-axis directions as horizontal directions parallel to the X-axis, not depicted, and is also rotatable by a rotary actuator, not depicted, about a central axis extending vertically parallel to the Z-axis perpendicular to the holding surface 11.

As illustrated in FIG. 1, each of the processing units 20 includes a cutting blade 21 and a spindle 22 having an end coupled to the cutting blade 21 and another end coupled to a rotary actuator, not depicted. The cutting blade 21 includes an extremely thin cutting grindstone substantially shaped as a ring. When the cutting blade 21 is rotated by the rotary actuator coupled to the spindle 22 about a central axis parallel to the Y-axis perpendicular to the X-axis, the cutting blade 21 is lowered to incise or cut into the workpiece 100 held on the chuck table 10 to cut the workpiece 100. The processing units 20 are movable along the Y-axis by respective Y-axis moving units 32 and also movable along the Z-axis by respective Z-axis moving units 33 with respect to the workpiece 100 held on the chuck table 10.

The X-axis moving unit of the processing apparatus 1 processing-feeds the chuck table 10 along the X-axis. The Y-axis moving units 32 of the processing apparatus 1 indexing-feed the respective processing units 20 along the Y-axis. The Z-axis moving units 33 incising-feed the respective processing units 20 along the Z-axis. Each of the X-axis moving unit, the Y-axis moving units 32, and the Z-axis moving units 33 includes a known ball screw rotatable about its central axis, a known stepping motor for rotating the ball screw about its central axis, and known guide rails on which the chuck table 10 or the processing unit 20 are movably supported for movement along the X-axis, the Y-axis, or the Z-axis. Furthermore, each of the X-axis moving unit, the Y-axis moving units 32, and the Z-axis moving units 33 includes a position detector for detecting the position of the chuck table 10 or the processing unit 20 along the X-axis, the Y-axis, or the Z-axis, and outputting the detected position to the control unit 98. As illustrated in FIG. 1, the processing apparatus 1 is a two-spindle dicer, i.e., a facing dual-type cutting apparatus, having two processing units 20.

As illustrated in FIG. 1, a portal-shaped first support frame 3 is erected from an apparatus body 2 and has a pair of vertical columns mounted on the apparatus body 2 and a horizontal beam interconnecting upper end portions of the columns. One of the processing units 20 is mounted on one of the columns of the first support frame 3 by one of the Y-axis moving units 32 and one of the Z-axis moving units 33. The other processing unit 20 is mounted on the other column of the second support frame 3 by the other Y-axis moving unit 32 and the other Z-axis moving unit 33. The upper end portion of the column is connected by the horizontal beam.

The processing apparatus 1 includes an image capturing unit 25 for capturing an image of the workpiece 100 held on the holding surface 11 of the chuck table 10. According to the first embodiment, the image capturing unit 25 is attached to one of the processing units 20 for movement in unison therewith. The image capturing unit 25 includes a CCD camera for capturing an image of a region to be divided of the workpiece 100 held on the chuck table 10 before the workpiece 100 is cut. The CCD camera performs an image capturing process on the workpiece 100 held on the chuck table 10 to obtain an image for performing an alignment process for positioning the workpiece 100 and the cutting blade 21 with respect to each other, and outputs the obtained image to the control unit 98.

The processing apparatus 1 operates as follows: While the cutting blade 21 is being rotated about its central axis by the rotary actuator coupled to the spindle 22, the X-axis moving unit, the Y-axis moving unit 32, and the Z-axis moving unit 33 are actuated to move the cutting blade 21 with respect to the workpiece 100 held on the chuck table 10 along one of the projected dicing lines 102, causing the cutting blade 21 to cut the workpiece 100 along the projected dicing line 102.

The cassette rest 40 includes a supporting stage for placing thereon a cassette 45 as a case that houses a plurality of workpieces 100 therein. The cassette rest 40 is vertically movable to lift and lower the cassette 45 placed thereon along the Z-axis. The loading/unloading unit 50 holds a workpiece 100 on a holding surface 51 thereof that is positioned therebeneath and takes the workpiece 100 into or out of the cassette 45. The cleaning device 55 cleans a workpiece 100 that has been cut while holding the workpiece 100 under suction on a holding surface 57 of a chuck table 56 that is similar in structure to the chuck table 10.

The delivery unit 60 delivers a workpiece 100 between the cassette 45 placed on the cassette rest 40 and the chuck tables 10 and 56. According to the first embodiment illustrated in FIG. 1, the delivery unit 60 is mounted on a portal-shaped second support frame 4 erected from the apparatus body 2 more closely to the loading/unloading unit 50 and the chuck tables 10, 55 than the first support frame 3. The second support frame 4 includes a pair of columns 5 and 6 mounted on the apparatus body 2 and having respective upper end portions interconnected by a horizontal beam 7. The delivery unit 60 includes a first delivery unit 60-1 for delivering a workpiece 100 between the loading/unloading unit 50 and the chuck table 10 and a second delivery unit 60-2 for delivering a workpiece 100 between the chuck table 10 and the chuck table 56 of the cleaning device 55. The first delivery unit 60-1 unloads a workpiece 100 to be cut from the loading/unloading unit 50 and loads the workpiece 100 onto the chuck table 10. The second delivery unit 60-2 unloads a workpiece 100 after cut from the chuck table 10 and loads the workpiece 100 onto the chuck table 56 of the cleaning device 55. The second delivery unit 60-2 unloads a workpiece 100 that has been cleaned from the chuck table 56 of the cleaning device 55 and loads the workpiece 100 onto the loading/unloading unit 50.

As illustrated in FIG. 1, each of the first and second delivery units 60-1 and 60-2 includes a base 61 and a moving unit 62 for moving the base 61. The moving unit 62 includes a unit support arm 63 having a distal end joined to the base 61, a Y-axis moving mechanism 64 for moving the unit support arm 63 along the Y-axis, and a lifting and lowering mechanism 65 mounted on the distal end of the unit support arm 63 for moving the base 61 along the Z-axis. The Y-axis moving mechanism 64 is mounted on the horizontal beam 7 of the second support frame 4. The portal-shaped second support frame 4 is erected from the apparatus body 2 and amounted more closely to a loading/unloading area than the support frame 3. The horizontal beam 7 connects a pair of columns 5 and 6 each other. The Y-axis moving mechanism 64 includes a known ball screw extending horizontally along the Y-axis and rotatable about its central axis, a known stepping motor coupled to one of the ball screw for rotating the ball screw about its central axis, and a known guide rail on which the unit support arm 63 is movably supported for movement along the Y-axis. The unit support arm 63 has a nut, not depicted, operatively threaded over the ball screw. The lifting and lowering mechanism 65 include a known air cylinder.

As illustrated in FIGS. 2, 3, and 4, the base 61 of each of the first and second delivery units 60-1 and 60-2 includes a disk-shaped base plate 66, a plurality of non-contact-type suction holders 67, a plurality of supports 68, and a plurality of outer circumferential support legs 69. The base plate 66 is mounted on the lower end of a rod of the air cylinder of the lifting and lowering mechanism 65. Therefore, the moving unit 62 moves the base plate 66. According to the first embodiment illustrated in FIG. 2, the base 61 includes three non-contact-type suction holders 67 and three supports 68 associated respectively therewith, all fixed to the base plate 66 at equally spaced intervals along circumferential directions of the base plate 66.

Each of the non-contact-type suction holders 67 includes a thick disk-shaped suction holder body 71, a fluid ejector 73 for ejecting air 200 from the center of a horizontally flat lower surface 72 of the suction holder body 71 along the lower surface 72, and a fluid communication tube 74 joined to an upper surface of the suction holder body 71 and held in fluid communication with the fluid ejector 73. The fluid communication tube 74 is of a hollow cylindrical structure extending upwardly from the center of the upper surface of the suction holder body 71, and, as illustrated in FIG. 2, is connected to a pressurized air supply source 76 through an on/off valve 75.

As illustrated in FIG. 3, the fluid communication tube 74 extends vertically through a through hole 77 defined in the base plate 66. The fluid communication tube 74 includes a radially outwardly protrusive bulge 78 whose outer circumferential surface is sandwiched between two members of the corresponding support 68. The two members of the corresponding support 68 are fastened to the base plate 66 by bolts 79 extending through the base plate 66 and threaded into the support 68, thereby securing the non-contact-type suction holder 67 to the base plate 66.

The non-contact-type suction holder 67 operates as follows: When the pressurized air supply source 76 is actuated, it supplies air 200 under pressure through the on/off valve 75 and the fluid communication tube 74 to the fluid ejector 73. The fluid ejector 73 ejects the supplied air 200 along the lower surface 72 of the suction holder body 71 to develop a negative pressure at the center of the lower surface 72 according to the Bernoulli's principle, thereby attracting a workpiece 100 toward the lower surface 72 that functions as a holding surface. When the workpiece 100 approaches the non-contact-type suction holder 67, the air 200 flowing between the lower surface 72 of the suction holder body 71 and the workpiece 100 acts as a repulsive force, preventing the non-contact-type suction holder 67 from contacting the workpiece 100. Therefore, as illustrated in FIGS. 3 and 4, the non-contact-type suction holder 67 holds the workpiece 100 under suction out of contact therewith.

The outer circumferential support legs 69 are fixed to the base plate 66. The outer circumferential support legs 69 act to engage an outer circumferential edge portion of the workpiece 100 held by the non-contact-type suction holders 67 to limit the workpiece 100 against horizontal movement. According to the first embodiment illustrated in FIG. 2, there are three outer circumferential support legs 69 fixed to the base plate 66 at equally spaced intervals along circumferential directions of the base plate 66. Each of the outer circumferential support legs 69 is disposed between adjacent two of the non-contact-type suction holders 67 along the circumferential directions of the base plate 66 more closely to an outer circumferential edge of the base plate 66 than the non-contact-type suction holders 67. Each of the outer circumferential support legs 69 is fastened to the base plate 66 by a bolt 81 extending through the base plate 66 and threaded into the outer circumferential support leg 69, and has a lower surface 82 slanted such that it is gradually inclined upwardly toward the center of the base plate 66. The outer circumferential support legs 69 limit the workpiece 100 against horizontal movement by keeping their slanged lower surfaces 82 in contact with the outer circumferential edge portion of the workpiece 100 while the non-contact-type suction holders 67 are attracting the workpiece 100 under suction out of contact therewith.

According to the first embodiment, as illustrated in FIG. 1, the measuring unit 85 is mounted indirectly on one of the processing units 20 with the image capturing unit 25 interposed therebetween, for movement in unison with the one of the processing units 20 and the image capturing unit 25. Specifically, the measuring unit 85 is movable along the Y-axis and the Z-axis respectively by the Y-axis moving unit 32 and the Z-axis moving unit 33. The measuring unit 85 may be mounted directly on one of the processing units 20.

According to the first embodiment, the measuring unit 85 includes a back pressure sensor. As illustrated in FIGS. 5 and 6, the measuring unit 85 includes an ejection nozzle 86 for ejecting air 300 (see FIG. 6) through an ejection port 87 toward the holding surface 51 of the loading/unloading unit 50 and the workpiece 100 held on the holding surface 51. As illustrated in FIG. 5, the ejection nozzle 86 is fixed, by a limit switch 97, to be described below, to a piston rod 89 of an air cylinder 88 that is mounted on the image capturing unit 25.

The ejection nozzle 86 is held in fluid communication with an air supply source 92 through a first passage 91. The air supply source 92 is also held in fluid communication with a second passage 93 that is vented to the atmosphere through a restrictor valve 94 at the distal end of the second passage 93. The air supply source 92 supplies air 300 (see FIG. 6) to the first passage 91 and the second passage 93 at a suitable ratio. The air 300 that flows through the first passage 91 is supplied to the ejection nozzle 86.

A differential pressure sensor 95 is connected between the first passage 91 and the second passage 93. The differential pressure sensor 95 has a diaphragm 96 and is electrically connected to the control unit 98. The diaphragm 96 is displaceable a distance depending on the difference between the air pressure in the first passage 91 and the air pressure in the second passage 93. The differential pressure sensor 95 outputs a voltage value commensurate with the distance by which the diaphragm 96 is displaced to the control unit 98.

When the air supply source 92 supplies air 300 to the first passage 91 and the second passage 93, the ejection nozzle 86 ejects the air 300 through the ejection port 87. In case there is no workpiece 100 present ahead of the air 300 ejected from the ejection port 87 of the ejection nozzle 86, the voltage value output from the differential pressure sensor 95 can be set to 1 V by adjusting the restrictor valve 94. A workpiece 100 that is present ahead of the air 300 ejected from the ejection port 87 but spaced 5 mm or wider from the ejection port 87, for example, is regarded as being not present.

The ejection nozzle 86 is oriented to have the ejection port 87 on its distal end facing the workpiece 100 on the loading/unloading unit 50. The air cylinder 88 may be actuated to lower the piston rod 89 to move the ejection port 87 toward the workpiece 100.

The limit switch 97 (see FIG. 5) by which the ejection nozzle 86 is fixed to the piston rod 89 is disposed beneath and joined to the lower end of the piston rod 89. The limit switch 97 limits descent of the ejection nozzle 86 and detects when the ejection nozzle 86 is in an operative position. The limit switch 97, which is electrically connected to the control unit 98, detects whether the ejection nozzle 86 is in the operative position or an inoperative position, and sends a signal representing the detected result to the control unit 98.

In case there is no obstacle, e.g., no workpiece 100, present ahead of the air 300 ejected from the ejection port 87 of the ejection nozzle 86, since the first passage 91 as well as the second passage 93 is vented to the atmosphere, the pressure in the first passage 91 and the pressure in the second passage 93 are in a state of equilibrium, so that the diaphragm 96 of the differential pressure sensor 95 is in an equilibrium position. As the voltage value output from the differential pressure sensor 95 with the diaphragm 96 in the equilibrium position is set to 1 V, the differential pressure sensor 95 outputs a voltage of 1 V at this time.

On the other hand, in case there is an obstacle, e.g., a workpiece 100, present ahead of the air 300 ejected from the ejection port 87 of the ejection nozzle 86, the ejection port 87 is obstructed by the workpiece 100, changing the pressure in the first passage 91 to displace the diaphragm 96 out of the equilibrium position, so that the differential pressure sensor 95 outputs a voltage value commensurate with the distance between the ejection port 87 and the workpiece 100.

The control unit 98 controls operation of the components of the processing apparatus 1 to enable the processing apparatus 1 to perform a processing process with the processing units 20, a delivering process with the delivery unit 60, a measuring process with the measuring unit 85, etc. According to the first embodiment, the control unit 98 includes a computer system having an arithmetic processing unit having a microprocessor such as a central processing unit (CPU), a storage device having a memory such as a read only memory (ROM) or a random access memory (RAM), and an input/output interface. The arithmetic processing unit of the control unit 98 carries out a processing sequence according to computer programs stored in the storage device and generates and outputs control signals for controlling the processing apparatus 1 through the input/output interface to the components of the processing apparatus 1.

The control unit 98 reads the voltage value output from the differential pressure sensor 95 and controls the Z-axis moving unit 33 and the air cylinder 88 according to the read voltage value to prevent the ejection nozzle 86 from hitting the holding surface 51 of the loading/unloading unit 50 or the face side 101 of the workpiece 100 held on the holding surface 51. The control unit 98 includes a storage 99 storing in advance, for example, data representing the relationship between distance values from the ejection port 87 of the ejection nozzle 86 to the holding surface 51 of the loading/unloading unit 50 or the face side 101 of the workpiece 100 held on the holding surface 51 and voltage values output from the differential pressure sensor 95. The storage 99 is implemented by the storage device of the computer system included in the control unit 98.

Therefore, the control unit 98 can determine the distance between the ejection port 87 of the ejection nozzle 86 and the holding surface 51 of the loading/unloading unit 50 or the face side 101 of the workpiece 100 held on the holding surface 51 on the basis of the voltage value output from the differential pressure sensor 95 and the relationship data stored in the storage 99. For example, if the voltage value output from the differential pressure sensor 95 is 5 V, then the control unit 98 determines the distance between the ejection port 87 and the holding surface 51 of the loading/unloading unit 50 or the face side 101 of the workpiece 100 held on the holding surface 51, as 100 μm, for example.

Operation of the processing apparatus 1 according to the first embodiment will be described below with reference to the drawings. The control unit 98 of the processing apparatus 1 controls the loading/unloading unit 50 to hold a workpiece 100 to be cut on its holding surface 51 in the cassette 45, remove the workpiece 100 from the cassette 45, and stop the loading/unloading unit 50 temporarily.

As indicated by the solid lines in FIG. 6, the control unit 98 controls the Z-axis moving unit 33 to bring the ejection port 87 of the ejection nozzle 86 sufficiently closely to the face side 101 of the workpiece 100 on the holding surface 51 of the loading/unloading unit 50 that has been temporarily stopped. At this time, the control unit 98 determines the position of the ejection port 87 along the Z-axis on the basis of information regarding the position along the Z-axis acquired from the Z-axis moving unit 33 and the air cylinder 88. The control unit 98 controls the measuring unit 85 to eject the air 300 from the ejection port 87 to the workpiece 100 and determines the distance between the ejection port 87 and the face side 101 of the workpiece 100 on the basis of the relationship data stored in the storage 99. The control unit 98 determines the position of the face side 101 of the workpiece 100 along the Z-axis on the basis of the position of the ejection port 87 along the Z-axis and the distance between the ejection port 87 and the face side 101 of the workpiece 100.

As indicated by the two-dot-and-dash lines in FIG. 6, the control unit 98 controls the Z-axis moving unit 33 to bring the ejection port 87 sufficiently closely to an exposed portion of the holding surface 51 of the loading/unloading unit 50 that has been temporarily stopped. Then, the control unit 98 performs a process similar to the above process of determining the position of the face side 101 of the workpiece 100 along the Z-axis held on the holding surface 51 of the loading/unloading unit 50 that has been temporarily stopped, determining the position of the exposed portion of the holding surface 51 along the Z-axis.

The control unit 98 controls the measuring unit 85 to determine the thickness of the workpiece 100 by subtracting the position of the exposed portion of the holding surface 51 along the Z-axis from the position of the face side 101 of the workpiece 100 along the Z-axis held on the holding surface 51 of the loading/unloading unit 50. The thickness of the workpiece 100 represents the height of the face side 101 of the workpiece 100 from the holding surface 51 of the loading/unloading unit 50. In such a manner, the measuring unit 85 measures the thickness, i.e., the height, of the workpiece 100 held on the holding surface 51 of the loading/unloading unit 50 without any parts of the measuring unit 85 contacting the workpiece 100.

The control unit 98 controls the delivery unit 60 to cause the lifting and lowering mechanism 65 of the moving unit 62 to adjust the height of the lower surface 72, i.e., a holding surface, of the non-contact-type suction holder 67 according to the thickness of the workpiece 100 measured by the measuring unit 85, placing the lower surface 72 in a position that is spaced from the face side 101, i.e., a held surface, of the workpiece 100, by a distance in a predetermined range. The predetermined range refers to a range of distances between the lower surface 72 of the non-contact-type suction holder 67 and the face side 101 of the workpiece 100, in which range the non-contact-type suction holder 67 can apply a sufficient negative pressure to the workpiece 100 to hold the workpiece 100 under a stable suction force. In other words, the control unit 98 controls the delivery unit 60 to adjust the height of the lower surface 72 of the non-contact-type suction holder 67 according to the thickness of the workpiece 100 measured by the measuring unit 85 to a height that is larger than the predetermined range by the thickness of the workpiece 100, from the holding surface 51 on which the workpiece 100 is held.

According to the first embodiment, specifically, the control unit 98 controls the moving unit 62 to adjust the height, denoted by 111 in FIG. 3 or 112 in FIG. 4, of the lower surface 72 of the non-contact-type suction holder 67 from the holding surface 51 of the loading/unloading unit 50 to a height that is represented by the sum of the thickness of the workpiece 100 measured by the measuring unit 85 and the predetermined range. More specifically, in case the thickness of the workpiece 100 is relatively small as illustrated in FIG. 3, the control unit 98 controls the moving unit 62 to adjust the height 111 of the lower surface 72 of the non-contact-type suction holder 67 from the holding surface 51 of the loading/unloading unit 50 to a value commensurate with the relatively small thickness of the workpiece 100. On the other hand, in case the thickness of the workpiece 100 is relatively large as illustrated in FIG. 4, the control unit 98 controls the moving unit 62 to adjust the height 111 of the lower surface 72 of the non-contact-type suction holder 67 from the holding surface 51 of the loading/unloading unit 50 to a value commensurate with the relatively large thickness of the workpiece 100.

After the control unit 98 has adjusted the height of the lower surface 72 of the non-contact-type suction holder 67, the control unit 98 controls the non-contact-type suction holder 67 to eject air 200 from the fluid ejector 73 along the lower surface 72 of the suction holder body 71 to develop a negative pressure on the lower surface 72 according to the Bernoulli's principle, thereby holding the workpiece 100 suction out of contact therewith. After the non-contact-type suction holder 67 has held the workpiece 100 under suction, the control unit 98 controls the moving unit 62 to deliver the workpiece 100 held under suction by the non-contact-type suction holder 67 onto the holding surface 11 of the chuck table 10. Thereafter, the control unit 98 controls the non-contact-type suction holder 67 to stop ejecting the air 200 and holding the workpiece 100 under suction, thereby placing the workpiece 100 onto the holding surface 11 of the chuck table 10.

According to the first embodiment, the processing unit 20 includes a cutting unit. The thickness of the workpiece 100 does not change largely when it is cut. Therefore, when the non-contact-type suction holder 67 is to hold the workpiece 100 after the workpiece 100 has been cut or cleaned, the control unit 98 does not need to measure the thickness of the workpiece 100 again, and can adjust the height of the lower surface 72 of the non-contact-type suction holder 67 according to the thickness of the workpiece 100 measured when the workpiece 100 prior to being cut is taken out of the cassette 45 by the loading/unloading unit 50. Specifically, for holding the workpiece 100 after it has been cut or cleaned under suction on the holding surfaces 11 and 57 of the chuck tables 10 and 56, the control unit 98 adjusts the height of the lower surface 72 of the non-contact-type suction holder 67 from the holding surfaces 11 and 57 of the chuck tables 10 and 56 to a height that is represented by the sum of the thickness of the workpiece 100 measured by the measuring unit 85 before the workpiece 100 is cut and the predetermined range.

With the processing apparatus 1 thus constructed according to the first embodiment, since the measuring unit 85 measures the thickness, i.e., the height, of the workpiece 100 and the moving unit 62 adjusts the height of the lower surface 72 of the non-contact-type suction holder 67 according to the measured thickness, even if a workpiece 100 taken out of the cassette 45 has a different thickness, the non-contact-type suction holder 67 can apply a sufficient negative pressure to the workpiece 100 according to the thickness of the workpiece 100, and can deliver the workpiece 100 while holding it under a stable suction force.

With the processing apparatus 1 according to the first embodiment, furthermore, since the measuring unit 85 includes a back pressure sensor, it can measure the thickness, i.e., the height, of the workpiece 100 out of contact therewith. Consequently, the processing apparatus 1 according to the first embodiment is capable of measuring the thickness of the workpiece 100, holding the workpiece 100 under suction, and delivering the workpiece 100 out of contact therewith, and hence keeping the face side 101 of the workpiece 100 in good quality.

Second Embodiment

A processing apparatus 1 according to a second embodiment of the present invention will be described below. The processing apparatus 1 according to the second embodiment is different from the processing apparatus 1 according to the first embodiment in that the measuring unit 85 includes an optical sensor, rather than a back pressure sensor. Other details of the processing apparatus 1 according to the second embodiment are identical to those of the processing apparatus 1 according to the first embodiment. Those identical details are denoted by identical reference characters and will be omitted from description.

The measuring unit 85 according to the second embodiment includes an irradiator for applying a laser beam to the holding surface 51 of the loading/unloading unit 50 or the face side 101 of the workpiece 100 held on the holding surface 51, and a beam detector for detecting a beam reflected from the holding surface 51 or the face side 101 that has been irradiated with the laser beam. The measuring unit 85 according to the second embodiment determines the distance from the measuring unit 85 to the holding surface 51 of the loading/unloading unit 50 or the face side 101 of the workpiece 100 held on the holding surface 51 on the basis of the beam reflected from the holding surface 51 or the face side 101 and detected by the beam detector. The measuring unit 85 according to the second embodiment performs other processing details that are identical to those of the measuring unit 85 according to the first embodiment. Consequently, the measuring unit 85 according to the second embodiment can measure the thickness, i.e., the height, of the workpiece 100 held on the holding surface 51 of the loading/unloading unit 50 out of contact therewith, i.e., without any parts of the measuring unit 85 contacting the workpiece 100.

Inasmuch as the processing apparatus 1 according to the second embodiment is different from the processing apparatus 1 according to the first embodiment in that the measuring unit 85 includes an optical sensor, rather than a back pressure sensor, the processing apparatus 1 according to the second embodiment offers the same advantages as those of the processing apparatus 1 according to the first embodiment.

Modification

A processing apparatus 1 according to a modification of the first and second embodiments will be described below. The processing apparatus 1 according to the modification is different from the processing apparatus 1 according to the first and second embodiments in that each of the processing units 20 is changed, i.e., is not a cutting unit. Other details of the processing apparatus 1 according to the modification are identical to those of the processing apparatus 1 according to the first and second embodiments. Those identical details are denoted by identical reference characters and will be omitted from description.

According to the modification, each of the processing units 20 may include a laser processing unit, a cleaning unit, a grinding unit, or the like. In case the processing units 20 includes a laser processing unit for applying a laser beam to the workpiece 100 to process the workpiece 100 or a cleaning unit for cleaning the workpiece 100, the thickness of the workpiece 100 does not change largely when it is processed by the laser beam as is the case with the first and second embodiments. Therefore, for holding the workpiece 100 after the workpiece 100 has been processed with the laser beam or cleaned, the control unit 98 adjusts the height of the lower surface 72 of the non-contact-type suction holder 67 according to the thickness of the workpiece 100 measured when the workpiece 100 prior to being cut is taken out of the cassette 45 by the loading/unloading unit 50.

In case the processing unit 20 includes a grinding unit for grinding the workpiece 100 with a grinding wheel, the thickness of the workpiece 100 changes due to the grinding of material off the workpiece 100. Therefore, for holding the workpiece 100 after the workpiece 100 has been processed with the grinding wheel or cleaned, the control unit 98 controls the measuring unit 85 to measure the thickness of the ground workpiece 100 again on the holding surface 11 of the chuck table 10, for example, and then controls the moving unit 62 to adjust the height of the lower surface 72 of the non-contact-type suction holder 67 according to the measured thickness of the ground workpiece 100.

Because the processing apparatus 1 according to the modification is different from the processing apparatus 1 according to the first and second embodiments in that the processing unit 20 is changed, the processing apparatus 1 according to the modification offers the same advantages as those of the processing apparatus 1 according to the first and second embodiments.

The present invention is not limited to the embodiments and modification described above. Various changes and modifications may be made therein without departing from the scope of the invention. According to the above embodiments, the measuring unit includes a back pressure sensor or an optical sensor. According to the present invention, however, the measuring unit is not limited to the sensors and may include a sensor of any type insofar as it is capable of measuring the thickness of a workpiece held on the holding surface of the loading/unloading unit. The measuring unit 85 may be disposed independently of the image capturing unit 25 and may be fixed to the lifting and lowering mechanism 65. According to such a modification, the measuring unit 85 is disposed above the loading/unloading unit 50 that holds a workpiece 100 unloaded from the cassette 45 and can be lifted and lowered with respect to the holding surface 51 of the loading/unloading unit 50. The measuring unit 85 detects the holding surface 51 or the face side 101 of the workpiece 100 while calculating the position, i.e., the height, of its own sensor.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A processing apparatus comprising:
a chuck table for holding a plate-shaped workpiece;
a processing unit for processing the workpiece held on the chuck table;
a cassette rest for placing thereon a cassette for housing the workpiece therein;
a delivery unit for delivering the workpiece between the cassette placed on the cassette rest and the chuck table; and
a measuring unit for measuring a thickness of the workpiece;
wherein the delivery unit includes:
  a base,
  a non-contact suction holder adjustable to the thickness of the workpiece for ejecting air to develop a negative pressure to attract and hold the workpiece under suction out of contact therewith, and
  a moving unit for moving the base, and
wherein a height of the non-contact suction holder is adjusted according to the thickness of the workpiece measured by the measuring unit to place the non-contact- suction holder in a position that is spaced from a face side of the workpiece by a distance in a predetermined range while the workpiece is being delivered by the delivery unit.

2. The processing apparatus according to claim 1, wherein the measuring unit includes a back pressure sensor or an optical sensor for measuring the thickness of the workpiece out of contact therewith.

3. The processing apparatus of claim 1, wherein the moving unit adjusts the height of the non-contact- suction holder based on the thickness of the workpiece.

4. The processing apparatus of claim 1, further including an outer circumferential support leg disposed on a side of the base corresponding with the workpiece for engaging with an outer circumferential edge portion of the workpiece.

* * * * *